United States Patent [19]

Johnson

[11] Patent Number: 4,920,652

[45] Date of Patent: May 1, 1990

[54] DOUBLE SIDED HACK-SAW BLADE

[76] Inventor: James D. Johnson, 9623 Majestic La., Stockton, Calif. 95209

[21] Appl. No.: 330,131

[22] Filed: Mar. 29, 1989

[51] Int. Cl.$^5$ .............................................. B23D 49/10
[52] U.S. Cl. ..................................... 30/504; 30/166.3; 93/835
[58] Field of Search ...................... 30/166 R, 392–394, 30/350, 353, 502, 504; 83/807, 835, 837

[56] References Cited

U.S. PATENT DOCUMENTS

| | | | |
|---|---|---|---|
| 2,365,301 | 12/1944 | Shortell | 83/835 R |
| 2,431,106 | 11/1947 | Brooke | 30/31.8 |
| 2,722,244 | 11/1955 | Schultz. | |
| 2,735,458 | 2/1956 | Buchmann. | |
| 2,783,792 | 3/1957 | Keesling. | |
| 2,954,118 | 9/1960 | Anderson | 30/323 |
| 3,033,251 | 5/1952 | Atkinson et al. | |

FOREIGN PATENT DOCUMENTS 439399  4/1912  France .................... 83/835

Primary Examiner—Douglas D. Watts
Attorney, Agent, or Firm—Jerry T. Kearns

[57] ABSTRACT

A double sided hack-saw blade is formed from a thin elongated metal strip having opposed longitudinal side edges respectively provided with first and second parallel saw tooth cutting edges. The blade is designed for reversible securement to a hack-saw handle to allow alternative use of the first and second cutting edges. The cutting edges may be formed with different tooth pitches to allow a single blade to be utilized for various diverse cutting operations. A removable cover for engagement with one of the cutting edges when not in use is formed from a three sided member having a rectangular channel dimensional for frictional engagement with the hack-saw blade. The cover includes a lubricating wick to lubricate the cutting edge and also provides protection to a user.

5 Claims, 2 Drawing Sheets

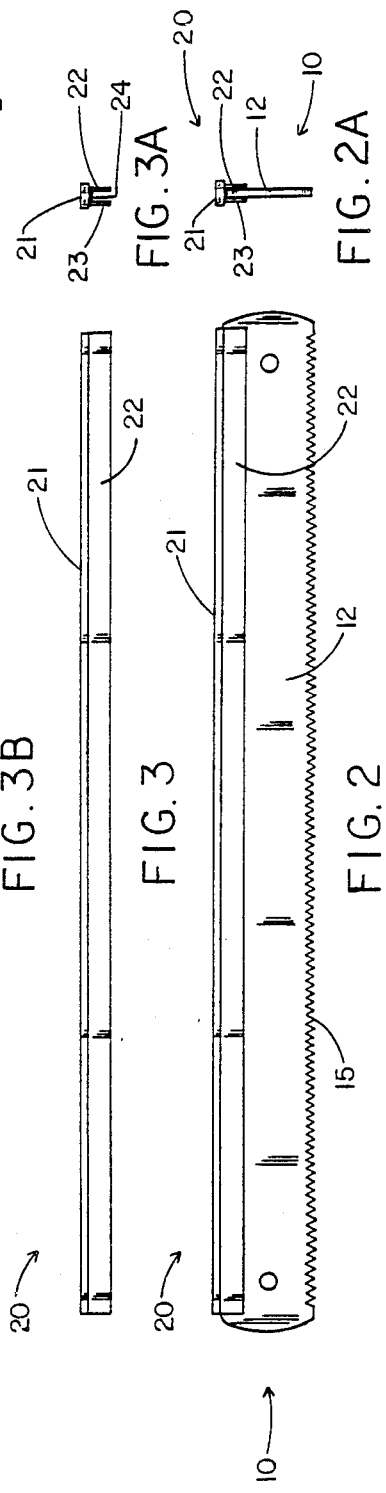

DOUBLE SIDED HACK-SAW BLADE

BACKGROUND OF THE INVENTION

1. Field of the Invention

The present invention relates to saw blades, and more particularly pertains to a double sided reversible hack-saw blade which may be formed with two different pitch cutting edges to allow usage for a variety of different cutting operations. Modern hack-saw blades are formed from a bimetallic construction and utilize a spring steel strip provided with a high speed steel cutting edge. These bimetallic hack-saw blades are extremely resistant to breakage, but the cutting edges are still subject to wear. When the cutting blade becomes dull, it must be discarded and replaced. In order to overcome this problem and to provide a more efficient and economical hack-saw blade, the present invention provides an elongated metal strip with parallel alternatively utilized cutting edges. When one cutting edge wears out, the blade is reversed and a fresh edge is available. Various teeth arrangements may be provided on opposite sides of the blade, for example one side may be formed with a pitch of thirty-two teeth per inch for fine cuts and the opposite cutting edge may have a pitch of twenty-four teeth per inch for rough or faster cuts. A combination of these features with the conventional bimetallic construction provides an extremely versatile and long lasting blade.

2. Description of the Prior Art

Various types of saw blades are known in the prior art. A typical example of such a saw blade is to be found in U.S. Pat. No. 2,431,106, which issued to M. Brooke on Nov. 18, 1947. This patent discloses a weed cutter having a blade formed from an elongated metal strip with longitudinal side edges provided with saw toothed cutting teeth. U.S. Pat. No. 2,722,244, which issued to G. Schultz on Nov. 1, 1955, discloses a reciprocating saw blade secured by a clamp adjacent one end. U.S. Pat. No. 2,735,458, which issued to A. Buchmann on Feb. 21, 1956, discloses a saw blade formed from an elongated metal strip and provided with a saw toothed cutting edge. U.S. Pat. No. 2,783,792, which issued to T. Keesling on Mar. 5, 1957, discloses a saw blade for a power operated saw formed from a thin elongated strip and provided with a single elongated saw tooth cutting edge. U.S. Pat. No. 3,033,251, which issued to G. Atkinson et al on May 8, 1952, discloses a double edged blade for a sabre saw formed from a thin elongated metal strip having two longitudinal side edges each provided with a saw tooth cutting edge.

While the above mentioned devices are directed to saw blades, none of these devices disclose a double sided hack-saw blade formed from a thin elongated metal strip having opposed longitudinal side edges forming first and second parallel saw tooth cutting edges adapted for reversible securement to a hack-saw handle. Additional features of the present invention, not contemplated by the aforesaid patents include the provision of a reversible saw blade with different pitch tooth portions enabling usage for a variety of different cutting operations, and a removable cover including a lubricating wick for covering one cutting edge of a double sided hack-saw blade while the opposite cutting edge is in use. Inasmuch as the art is relatively crowded with respect to these various types of saw blades, it can be appreciated that there is a continuing need for and interest in improvements to such saw blades, and in this respect, the present invention addresses this need and interest.

SUMMARY OF THE INVENTION

In view of the foregoing disadvantages inherent in the known types of saw blades now present in the prior art, the present invention provides an improved double sided hack-saw blade. As such, the general purpose of the present invention, which will be described subsequently in greater detail, is to provide a new and improved double sided hack-saw blade which has all the advantages of the prior art saw blades and none of the disadvantages.

To attain this, representative embodiments of the concepts of the present invention are illustrated in the drawings and make use of a double sided hack-saw blade formed from a thin elongated metal strip having opposed longitudinal side edges respectively provided with first and second parallel saw tooth cutting edges. The blade is designed for reversible securement to a hack-saw handle to allow alternative use of the first and second cutting edges. The cutting edges may be formed with different tooth pitches to allow a single blade to be utilized for various diverse cutting operations. A removable cover for engagement with one of the cutting edges when not in use is formed from a three sided member having a rectangular channel dimensioned for frictional engagement with the hack-saw blade. The cover includes a lubricating wick to lubricate the cutting edge and also provides protection to a user.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseologY, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved double sided hack-saw blade which has all the advantages of the prior art saw blades and none of the disadvantages.

It is another object of the present invention to provide a new and improved double sided hack-saw blade which may be easily and efficiently manufactured and marketed.

It is a further object of the present invention to provide a new and improved double sided hack-saw blade which is of a durable and reliable construction.

An even further object of the present invention is to provide a new and improved double sided hack-saw blade which is susceptible of a low cost of manufacture with regard to both materials and labor, and which accordingly is then susceptible of low prices of sale to the consuming public, thereby making such saw blades economically available to the buying public.

Still yet another object of the present invention is to provide a new and improved double sided hack-saw blade which provides in the apparatuses and methods of the prior art some of the advantages thereof, while simultaneously overcoming some of the disadvantages normally associated therewith.

Still another object of the present invention is to provide a new and improved double sided hack-saw blade which provides for increased wear life by allowing reversible mounting to provide a fresh cutting edge.

Yet another object of the present invention is to provide a new and improved double sided hack-saw blade suitable for usage in a variety of different cutting operations through the provision of a reversible cutting blade having a pair of different pitch cutting edges.

Even still another object of the present invention is to provide a new and improved double sided hack-saw blade including a frictional engaged cover having a lubricating wick for installation on an unused edge while the opposite cutting edge is being utilized.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view illustrating the double sided hack-saw blade according to a first embodiment of the present invention.

FIG. 2 is a plan view of the hack-saw blade of FIG. 1, with a removable cover installed.

FIG. 2A is an end view of the hack-saw blade and installed cover of FIG. 2.

FIG. 3 is a side view of the removable blade cover.

FIG. 3A is an end view of the removable blade cover of FIG. 3.

FIG. 3B is a top view of the blade cover of FIG. 3.

FIG. 4 illustrates a double sided hack-saw blade according to a second embodiment of the present invention, having parallel opposed cutting edges provided with different pitch saw tooth cutting edges.

DESCRIPTION OF THE PREFERRED EMBODIMENT

With reference now to the drawings, and in particular to FIG. 1 thereof, a new and improved double sided hack-saw blade embodying the principles and concepts of the present invention and generally designated by the reference numeral 10 will be described.

More specificallY, it will be noted that the first embodiment 10 of the invention includes a thin elongated metal strip 12 having a pair of spaced apertures 13 and 14 for reversibly securing the strip 12 to a hack-saw handle in a conventional fashion. Opposed longitudinal side edges 15 and 16 of the strip 12 are provided with saw tooth cutting edges. The blade 12 may be formed from a bimetallic construction which utilizes spring steel for the main body portion of the strip 12 and high speed steel for the cutting edges 15 and 16.

FIG. 2 illustrates the blade 10 with a removable cover 20 frictionally engaged over the cutting edge 16. The cover 20 protects the unused cutting edge and an operator during some uses of the edge 15. The cover 20 includes a top portion 21 and a side wall 22. The cover 20 must be removed for deep cuts, to allow passage of the blade through the saw kerf. A pair of the covers 20 may be utilized to protect both saw edges during storage.

As shown in FIG. 2A, the cover 20 is formed from two parallel side walls 22 and 23 connected by a top portion 21, forming a three sided rectangular channel dimensioned for frictional engagement with the strip 12.

FIG. 3 is a side view of the cover 20, removed from the hack-saw blade.

As shown in FIG. 3A, the inner wall of the top portion 21 of the cover 20 may be provided with an elongated wick strip 24 formed from a felt or other absorbent material saturated with a lubricant for treating the cutting edges of the hack-saw blade. This prepares the cutting edge for efficient usage and additionally prevents corrosion of the cutting edge.

FIG. 3B is a top view which illustrates the top wall portion 21 of the cover 20.

FIG. 4 illustrates a hack-saw blade 10' according to a second embodiment of the present invention, in which the cutting edges 15 and 16' are formed with a different tooth pitch to enable usage with a variety of different cutting operations. For example, the cutting edge 15 may be formed with a pitch of thirty-two teeth per inch for fine cutting operation and the cutting edge 16' may have a pitch of twenty-four teeth per inch for rough or faster cutting. The double sided hack-saw blade 10' must maintain the same offset on both cutting edges, regardless of the different cutting pitch provided. If the offset were different on opposite sides, the side with the larger offset would bind as the blade passed through the kerf left by the lead cutting edge. Thus, the present invention discloses a long lasting, efficient hack-saw blade suitable for a wide variety of different cutting operations. The removable cover 20 may be formed from a resilient plastic or a thin gage metal material and serves the dual purpose of protecting and lubricating the unused cutting edge and preventing possible injury to an operator.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. A double sided hack-saw blade, comprising:
   a thin elongated metal strip having opposed longitudinal side edges provided with first and second parallel saw tooth cutting edges;
   means for reversibly securing said strip to a hack-saw handle to allow alternative use of said first and second cutting edges;
   a removable cover for engagement with one of said cutting edges when not in use;
   and
   a lubricating wick in said cover for lubricating said hack-saw blade.

2. The double sided hack-saw blade of claim 1, wherein said first and second cutting edges have a different pitch.

3. The double sided hack-saw blade of claim 1, wherein said cover comprises a three-sided member having a rectangular channel dimensioned for frictional engagement with said hack-saw blade.

4. A double sided hack-saw blade, comprising:
   a thin elongated metal strip having opposed longitudinal side edges provided with first and second parallel saw tooth cutting edges;
   means for reversibly securing said strip to a hack-saw handle to allow alternative use of said first and second cutting edges;
   a removable cover for engagement with one of said cutting edges when not in use, said cover formed as a three-sided member having a rectangular channel dimensioned for frictional engagement with said hack-saw blade;
   and
   a lubricating wick in said cover for lubricating said hack-saw blade.

5. The double sided hack-saw blade of claim 4, wherein said first and second cutting edges have a different pitch.

* * * * *